US008896255B2

United States Patent
Iwashita et al.

(10) Patent No.: US 8,896,255 B2
(45) Date of Patent: Nov. 25, 2014

(54) SERVO CONTROLLER HAVING FUNCTION FOR CORRECTING AMOUNT OF EXPANSION/CONTRACTION OF BALL SCREW

(71) Applicant: Fanuc Corporation, Minamitsuru-gun, Yamanashi (JP)

(72) Inventors: Yasusuke Iwashita, Yamanashi (JP); Kenichi Takayama, Yamanashi (JP); Satoshi Ikai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/908,567

(22) Filed: Jun. 3, 2013

(65) Prior Publication Data
US 2013/0320908 A1 Dec. 5, 2013

(30) Foreign Application Priority Data

Jun. 4, 2012 (JP) .................................. 2012-126893
Oct. 10, 2012 (JP) .................................. 2012-225091

(51) Int. Cl.
G05B 19/404 (2006.01)
G05B 11/01 (2006.01)

(52) U.S. Cl.
CPC .... G05B 11/011 (2013.01); *G05B 2219/41127* (2013.01); G05B 19/404 (2013.01); *G05B 2219/41164* (2013.01)
USPC ........... 318/632; 318/560; 318/561; 318/567; 318/280; 700/13; 700/12; 700/28; 700/33; 700/45

(58) Field of Classification Search
CPC .............................. G05B 13/042; G05B 11/28
USPC ........ 318/560, 561, 567, 280; 700/13, 12, 28, 700/33, 45
See application file for complete search history.

(56) References Cited

U.S. PATENT DOCUMENTS 4,573,379 A * 3/1986 Bald ................................ 82/145
5,767,645 A * 6/1998 Park .............................. 318/560
(Continued)

FOREIGN PATENT DOCUMENTS

DE 102008011031 A1 8/2008
JP 04-250950 9/1992
(Continued)

OTHER PUBLICATIONS

Office Action mailed May 28, 2014, corresponds to German patent application No. 102013105499.4.

*Primary Examiner* — Rita Leykin
(74) *Attorney, Agent, or Firm* — Lowe Hauptman & Ham, LLP

(57) ABSTRACT

A servo controller, capable of controlling the motion of a movable body with high accuracy, without depending on the position of the movable body which is moved on a ball screw. The servo controller has a position command generating part which generates a position command value; a velocity command generating part which generates a velocity command value based on the position command value and a position detection value; a torque command generating part which generates a torque command value based on the velocity command value and a velocity detection value; and a position compensation calculating part which calculates an amount of expansion/contraction of the ball screw based on a distance from the servomotor to a nut threadably engaged with the ball screw and the torque command value, and calculates a position compensation based on the amount of expansion/contraction.

5 Claims, 4 Drawing Sheets

(56) References Cited

U.S. PATENT DOCUMENTS

| | | |
|---|---|---|
| 6,738,679 B2 * | 5/2004 | Fujita et al. .................. 700/56 |
| 7,248,014 B2 * | 7/2007 | Genma et al. ................ 318/638 |
| 7,434,505 B2 * | 10/2008 | Suzuki et al. ................. 100/43 |
| 2008/0203959 A1 | 8/2008 | Norihisa |

FOREIGN PATENT DOCUMENTS

| | | |
|---|---|---|
| JP | 07-266190 | 10/1995 |
| JP | 2000-172341 A | 6/2000 |
| JP | 2003-058213 A | 2/2003 |
| JP | 2004-187432 A | 7/2004 |

* cited by examiner

SERVO CONTROLLER HAVING FUNCTION FOR CORRECTING AMOUNT OF EXPANSION/CONTRACTION OF BALL SCREW

RELATED APPLICATIONS

The present application is based on, and claims priority from, Japanese Application Number 2012-126893, filed Jun. 4, 2012, and Japanese Application Number 2012-225091, filed Oct. 10, 2012, the disclosure of which is hereby incorporated by reference herein in its entirety.

BACKGROUND OF THE INVENTION

1. Field of the Invention

The present invention relates to a servo controller, and in particular, relates to a servo controller for controlling a feed axis which converts rotational motion of a servomotor into linear motion by using a ball screw.

2. Description of the Related Art

Generally, in a feed axis using a ball screw, when a moving direction of a movable body attached to the feed axis is reversed, delays occur in the reverse motion due to backlash (or mechanical clearance) and friction. The delay due to the backlash can be corrected by applying a position compensation corresponding to an amount of the backlash to a position command vale, and the delay due to the friction can be corrected by applying an amount of velocity correction for compensating the delay due to the friction to a velocity command value. In this regard, these compensations may be varied corresponding to a reverse direction (from a forward (plus) direction to a backward (minus) direction, or vice-versa).

Factors in decreasing the precision of the feed axis using the ball screw include expansion/contraction in the axial direction of the ball screw, as well as the above backlash. In order to carry out the correction in view of this matter, a technique for utilizing torque has been proposed. For example, Japanese Unexamined Patent Publication (Kokai) No. 2000-172341 describes that "in a control system for controlling torque generated by an electric motor by carrying out feedback control or feedforward control, based on a position command value which is output from a position command generating part, the torque generated by the motor or a signal corresponding to the torque is added to a position command value after multiplied by a predetermined constant value. Therefore, by a simple process for multiplying the torque by the constant value, the position command for the electric motor may be corrected by an amount of expansion/contraction of a spring corresponding to the rigidity of a machine by means of the torque generated by the motor."

Japanese Unexamined Patent Publication (Kokai) No. 2004-187432 describes that "corresponding to an amount of torsion or expansion/contraction of a shaft estimated by a load model, a position command value is corrected so as to reduce the amount of torsion or expansion/contraction of the shaft."

Further, Japanese Unexamined Patent Publication (Kokai) No. 2003-58213 describes that "in first to eighth embodiments, a spring constant (rigidity) is set to a constant value K0 at load correction part 9. However, when the spring constant varies depending on position θ1 of load 1, a numeric controller may be configured wherein load correction part 9 calculates load torque correction value 27 while the spring constant is variable."

The ball screw expands or contracts in the axial direction thereof by reactive force from a movable body, such as a nut, which is threadably engaged with the ball screw. When the positional accuracy of the movable body is required to be high, it is necessary to take the amount of expansion/contraction of the ball screw into consideration. However, since this amount of expansion/contraction varies corresponding to the distance from a servomotor to the movable body, the positional accuracy may be lowered depending on the position where the movable body is accelerated or decelerated (in particular, where the moving direction of the movable body is reversed). For example, when the position compensation value is calculated by using the position where is relatively near the servomotor as a reference position, control with high accuracy can be carried out in the vicinity of the reference position, whereas the accuracy of the control is lowered at a position where is relatively away from the servomotor. To the contrary, when the position compensation value is calculated by using the position where is relatively away from the servomotor as a reference position, control with high accuracy can be carried out in the vicinity of the reference position, whereas the accuracy of the control is lowered at a position that is relatively near the servomotor.

Japanese Unexamined Patent Publication (Kokai) No. 2000-172341 suggests that, when the position command is corrected by the amount of expansion/contraction of the spring corresponding to the rigidity of the machine, the torque multiplied by a constant is added to the position command. However, this technique is not intended to carry out the correction in view of the position of the movable body on the ball screw. Also, in Japanese Unexamined Patent Publication (Kokai) No. 2004-187432, the position value is estimated by inputting a position detection value and a velocity detection value into the load model. However, the torque is not taken into consideration when calculating the estimated position value.

Further, in Japanese Unexamined Patent Publication (Kokai) No. 2003-58213, in view of the case wherein the spring constant varies depending on the position of the load, the load torque is calculated by using the spring constant as a variable value. However, it is not described that a proper position compensation value is calculated corresponding to the position of the load and the calculated value is used for feedback control.

SUMMARY OF THE INVENTION

An object of the present invention is to provide a servo controller, capable of controlling the motion of a movable body with high accuracy, without depending on the position of the movable body which is moved on a ball screw.

The present invention provides a servo controller for controlling a feed axis of a machine tool by using a servomotor connected to a ball screw, the servo controller comprising: a position command generating part which generates a position command value for the feed axis; a position detecting part which detects an angular position of the servomotor; a velocity command generating part which generates a velocity command value for the servomotor based on the position command value generated by the position command generating part and a position detection value detected by the position detecting part; a velocity detecting part which detects a velocity of the servomotor; a torque command generating part which generates a torque command value for the servomotor based on the velocity command value generated by the velocity command generating part and a velocity detection value detected by the velocity detecting part; and a position compensation calculating part which calculates a position compensation for a movable body threadably engaged with the ball screw, wherein the position compensation calculating part calculates an amount of expansion/contraction of the ball screw based on a distance from the servomotor to the movable body and the torque command value generated by the torque command generating part, and calculates the position compensation based on the calculated amount of expansion/contraction of the ball screw.

In a preferred embodiment, the servo controller further comprises a distance calculating part which calculates the distance from the servomotor to the movable body threadably engaged with the ball screw, by using an angular position of the servomotor. In addition, the distance calculating part may calculate the distance from the servomotor to the movable body threadably engaged with the ball screw as a distance from a fixed portion of the ball screw at a servomotor side to the movable body threadably engaged with the ball screw.

In a preferred embodiment, the distance calculating part utilizes a parameter which is previously determined based on a dimension of each component so as to represent a relationship between the distance from the movable body to the servomotor and a rotational angular position of the ball screw, and calculates the distance from the movable body to the servomotor in real-time at the angular position of the servomotor detected by the position detecting part. As the parameter previously determined based on the dimension of each component, a diameter, a cross-sectional area or a Young's modulus of the ball screw may be used.

In a preferred embodiment, the position compensation calculating part calculates the position compensation by multiplying the distance from the servomotor to the movable body by the torque command value so as to obtain a product, and by further multiplying the product by a first coefficient relating to the ball screw.

In a preferred embodiment, the position compensation calculating part calculates the position compensation by multiplying the distance from the servomotor to the movable body by a first coefficient relating to the ball screw so as to obtain a product, by adding a second coefficient relating to a coupling for coupling the servomotor and the ball screw to the product so as to obtain a summation, and by further multiplying the summation by the torque command value.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
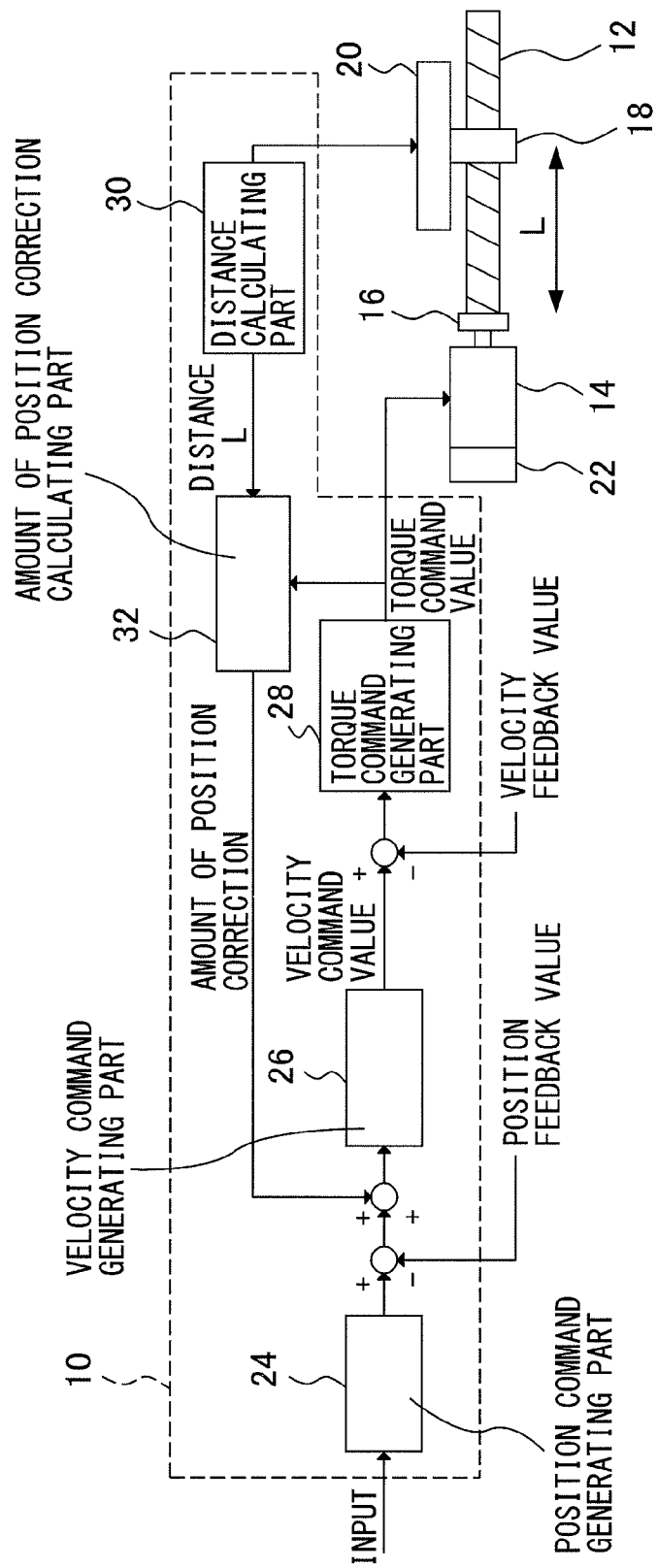
FIG. 1 shows a schematic configuration of a servo controller according to the present invention, with a feed axis driven by a servomotor.

FIG. 1 shows a schematic configuration of a servo controller according to the present invention. Servo controller 10 is a controller for controlling a servomotor 14 connected to a ball screw 12 so as to control a feed axis or a feed shaft of a machine tool. In the illustrated embodiment, ball screw 12 is coupled to servomotor 14 via a coupling 16. Due to rotational driving of servomotor 14, a movable body, such as a nut 18, which is threadably engaged with ball screw 12, is moved on ball screw 12 in an axial direction thereof. A table 20 is connected to nut 18. A rotational angular position and a rotational velocity of servomotor 14 can be detected by means of a position/velocity detector such as an encoder 22 associated with servomotor 14. The detected position and velocity may be utilized as a position feedback value and a velocity feedback value, respectively.

Servo controller 10 has a position command generating part 24 which generates a position command value for servomotor 14 according to a program or command input from a higher-level controller or external input device (not shown); a velocity command generating part 26 which generates a velocity command value for servomotor 14 based on the position command value generated by position command generating part 24 and a position detection value (or a position feedback value) detected by encoder 22; a torque command generating part 28 which generates a torque command value for servomotor 14 based on the velocity command value generated by velocity command generating part 26 and a velocity detection value (or a velocity feedback value) detected by encoder 22; and a position compensation calculating part 32 which calculates an amount of expansion/contraction of ball screw 12 based on a distance L from servomotor 14 to nut 18 threadably engaged with ball screw 12 and the torque command value generated by torque command generating part 28, and calculates a position compensation for nut 18 based on the amount of expansion/contraction of the ball screw. Further, servo controller 10 may have a distance calculating part 30 which calculates distance L from servomotor 14 to nut 18 on ball screw 12, by using the position of servomotor 14.

Position compensation calculating part 32 calculates the amount of expansion/contraction of ball screw 12 based on distance L from servomotor 14 to nut 18 calculated by distance calculating part 30 and the torque command value generated by torque command generating part 28, and calculates the position compensation based on the calculated amount of expansion/contraction of ball screw 12. Hereinafter, the detail of which is explained.

Figure 2:
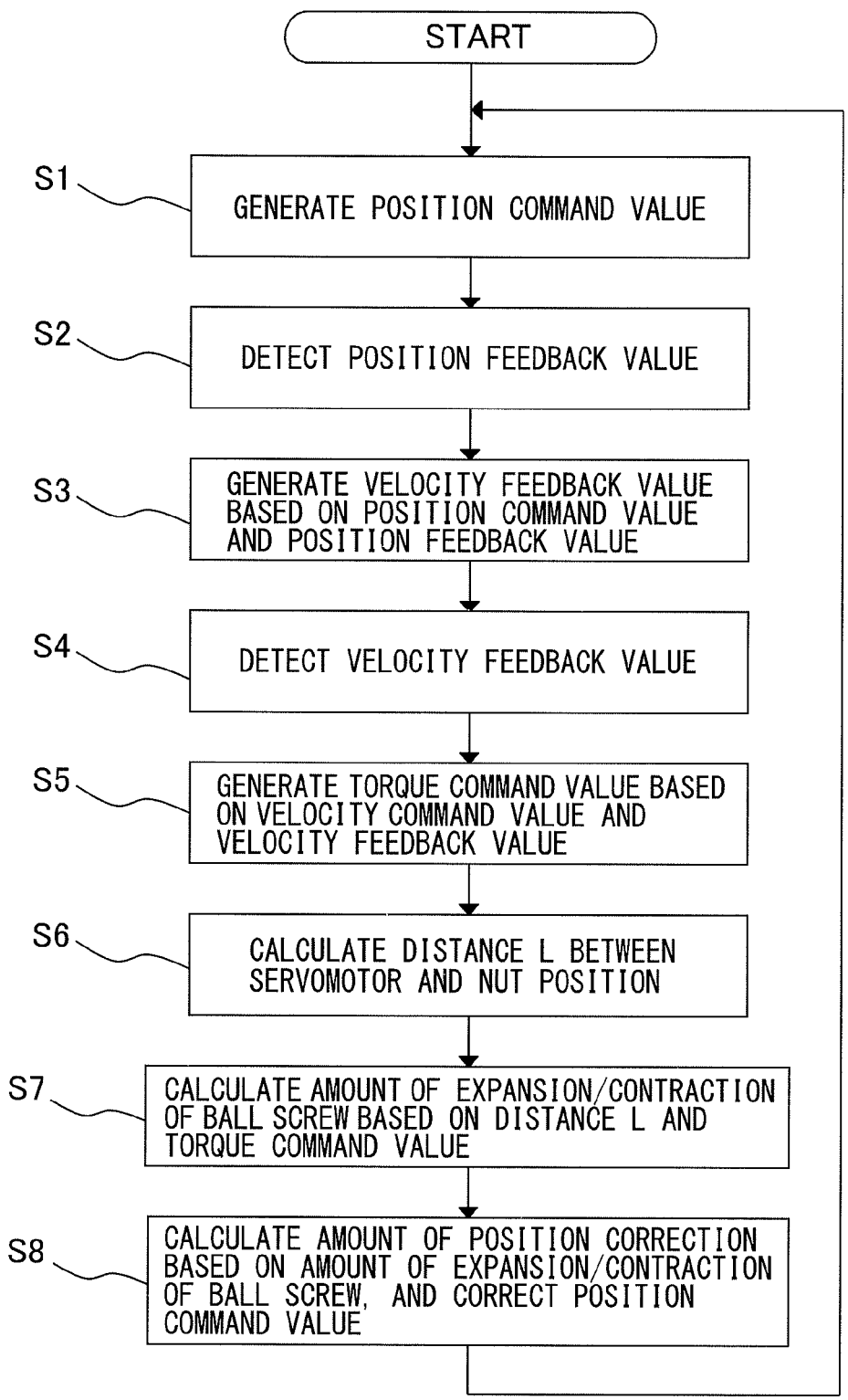
FIG. 2 is a flowchart showing an example of the procedure in the servo controller.

FIG. 2 is a flowchart showing an example of the procedure for correcting the command for servomotor 14 by using servo controller 10. First, in step S1, position command generating part 24 as described above generates the position command value for the feed axis. Next, in step S2, the position feedback value of servomotor 14 is detected by the position detecting part such as encoder 22. Then, in step S3, velocity command generating part 26 as described above generates the velocity command value for servomotor 14 based on the position command value generated by position command generating part 24 and the position feedback value detected by encoder 22.

In the next step S4, the velocity feedback value is detected by using the velocity detecting part such as encoder 22. Then, in step S5, torque command generating part 28 as described above generates the torque command value for servomotor 14 based on the velocity command value generated by velocity command generating part 26 and the velocity feedback value detected by encoder 22.

In the next step S6, distance calculating part 30 as described above calculates the distance from servomotor 14 to nut 18. For example, distance L at the rotational angular position of servomotor 14 detected by encoder 22 can be calculated in real-time, by utilizing a parameter (for example, a diameter, a cross-sectional area or a Young's modulus of ball screw 12) which is previously determined based on a dimension of each component (for example, coupling 16, ball screw 12 and nut 18) so as to represent a relationship between distance L (FIG. 1) from (a representative point of) nut 18 on ball screw 12 to (a representative point of) servomotor 14 and the rotational angular position of servomotor 14 (or the rotational angular position of ball screw 12). Otherwise, distance calculating part 30 may calculate a distance from a fixed portion of ball screw 12 on the servomotor side to nut 18, instead of the distance from servomotor to nut 18.

Next, in step S7, the amount of expansion/contraction of ball screw 12 in the axial direction thereof is calculated, based on distance L calculated in step S6 and the torque command value generated by torque command generating part 28. If necessary, an error of positioning for nut 18 may be calculated, which is generated via ball screw 12 due to the torsion of coupling 16 in the rotational direction. Hereinafter, the detail of which is explained.

When nut 18 connected to table 20 is moved on ball screw 12 by the rotational torque of servomotor 14, compressive or tensile force due to reactive force from nut 18 is applied to a portion of ball screw 12, and the portion of which corresponds to distance L from servomotor 14 (or coupling 16) to nut 18. Then, when a Young's modulus of the portion of ball screw 12 corresponding to distance L is equal to "E," following equation (1) is true. In equation (1), a character "k" means a spring constant of the portion of ball screw 12 corresponding to distance L, and a character "S" means a radial cross-sectional area of ball screw 12.

$$k = E \cdot S / L \quad (1)$$

The relationship between rotational torque T of servomotor 14 and amount of expansion/contraction $\epsilon 1$ of ball screw 12 can be calculated by following equation (2). In equation (2), $\alpha 1$ and $\alpha 1'$ are first coefficient regarding ball screw 12, concretely, may be determined by Young's modulus and the radial cross-sectional area of ball screw 12. Otherwise, $\alpha 1$ and $\alpha 1'$ may be determined experimentally.

$$\epsilon 1 = \alpha 1 \cdot T / k = \alpha 1 \cdot T \cdot L / (E \cdot S) = \alpha 1' \cdot T \cdot L \quad (2)$$

On the other hand, when the rotational torque is applied to coupling 16, coupling 16 is twisted in the rotational direction. Therefore, ball screw 12 is not positioned at a desired rotational angular position, whereby a positioning error of nut 18 may occur. Generally, an amount of torsion of coupling 16 in the rotational direction is proportional to the rotational torque of servomotor 14. Therefore, a positioning error $\epsilon 2$ of nut 18, generated by the torsion of coupling 16 in the rotational direction via ball screw 12, is represented by following equation (3). In equation (3), $\alpha 2$ means a second efficient regarding coupling 16, concretely, may be determined material and dimension of coupling 16. Otherwise, $\alpha 2$ may be determined experimentally.

$$\epsilon 2 = \alpha 2 \cdot T \quad (3)$$

Accordingly, an amount of axial error $\epsilon$ due to the rotational torque can be represented by following equation (4), also in view of the amount of positioning error generated by the torsion of coupling 16 in the rotational direction via ball screw 12. In other words, $\epsilon$ can be determined as a function of distance L and torque T.

$$\epsilon = \epsilon 1 + \epsilon 2 = (\alpha 1' \cdot L + \alpha 2) \cdot T \quad (4)$$

Finally, in step S8, a position compensation for nut 18 based on an amount of expansion/contraction $\epsilon 1$ or amount of error $\epsilon$ calculated in step S7, and then, the position command value generated by position command generating part 24 is corrected by using the position compensation (see FIG. 1). The procedure of Steps S1 to S8 is repeated at predetermined control intervals, until a predetermined motion of the feed axis is completed.

As explained above, in the present invention, the amount of expansion/contraction of ball screw 12 (further, if necessary, the amount of positioning error generated by the torsion of coupling 16 in the rotational direction via ball screw 12) is (are) calculated based on the torque and distance L from servomotor 14 to nut 18, and the amount of expansion/contraction is used as the position compensation. Therefore, at any position of nut 18 on ball screw 12 (in particular, even when nut 18 is positioned at a position where is relatively away from servomotor 14), an appropriate position compensation may be obtained in real-time, whereby the positional accuracy of table 20 may be improved.

Figure 3:
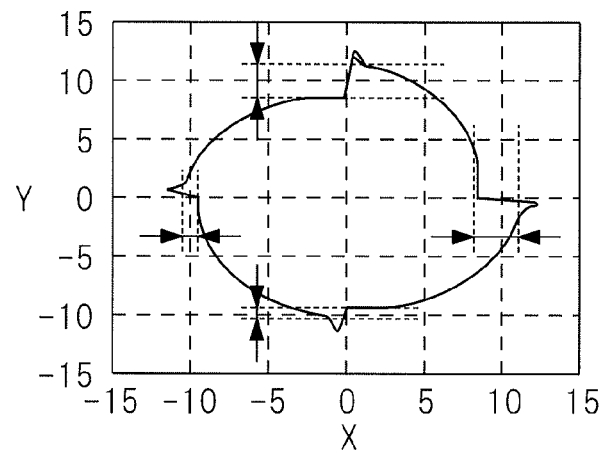
FIG. 3 is a graph showing an example of a trajectory of a movable body when the present invention and backlash correction are not applied.
Figure 4:
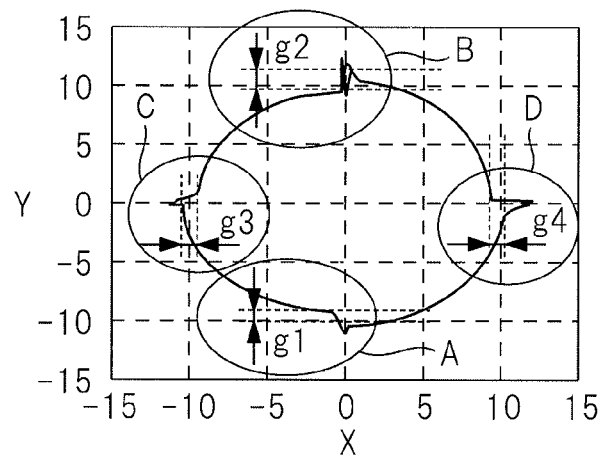
FIG. 4 is a graph showing an example of a trajectory of the movable body when the present invention is not applied but the backlash correction is applied.
Figure 5:
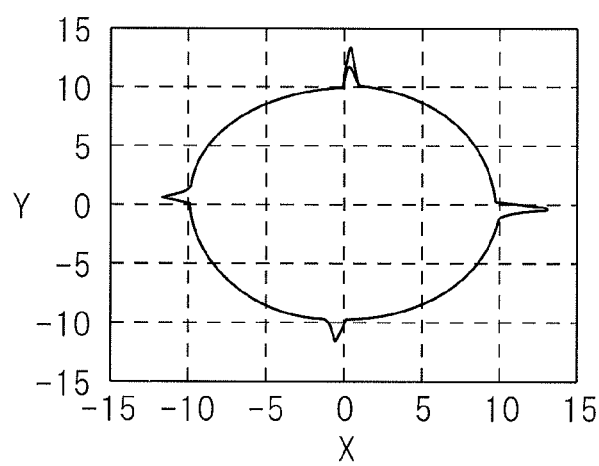
FIG. 5 is a graph showing an example of a trajectory of the movable body when the present invention and backlash correction are applied.

FIGS. 3 to 5 show examples wherein a movable body such as a table is controlled so as to move along a circular trajectory by means of two axes (X and Y axes) orthogonal to each other. Although horizontal and vertical axes (X and Y axes) are represented by arbitrary unit in each of FIGS. 3 to 5, the displayed trajectory is enlarged in an error direction (or a radial direction) for clarity.

FIG. 3 shows a trajectory, as a comparative example, wherein the movable body is moved when the present invention and backlash correction are not applied. In this case, at a point (four points in this case) where the moving direction of each axis is reversed, there exists a relatively large step (i.e., an error relative to an ideal circular trajectory) between before and after the reverse point.

FIG. 4 shows a trajectory, as a comparative example, wherein the movable body is moved when the present invention is not applied but the backlash correction is applied. In this case, the dimension of the step between before and after the reverse point is smaller than that of FIG. 3. However, the dimension of the step of FIG. 4 is not still preferable. Further, as described below, the step wherein the nut (or the movable body) is away from the servomotor is larger than the step wherein the nut is relatively close to the servomotor.

Figure 6:
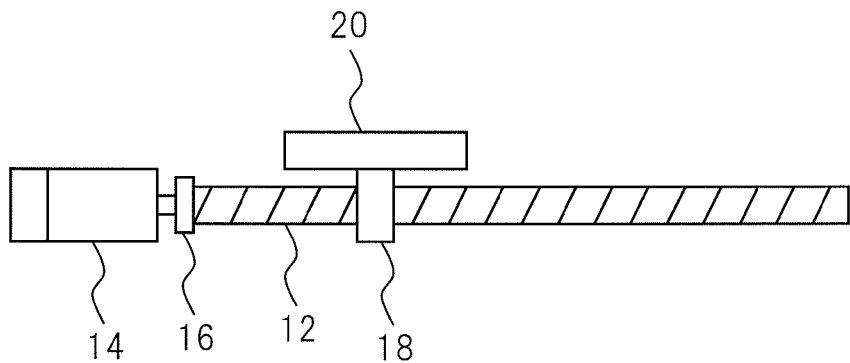
FIG. 6 shows a state wherein a nut is positioned at a position which is relatively close to the servomotor.
Figure 7:
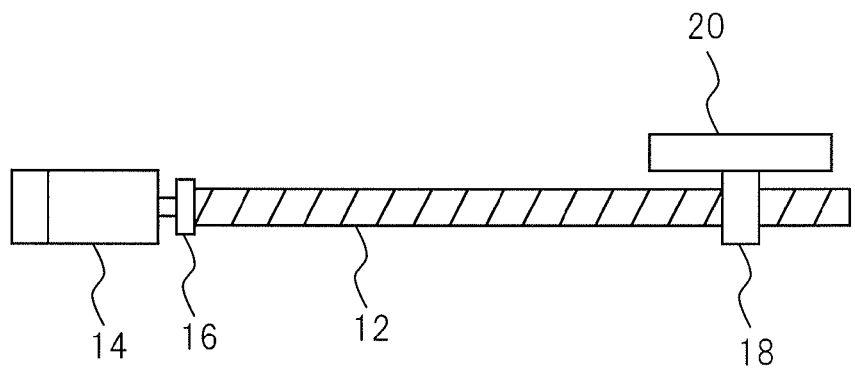
FIG. 7 shows a state wherein a nut is positioned at a position which is relatively away from the servomotor.

Sections A and B of FIG. 4 represent the reverse point of the X-axis. In detail, section A represents the reverse of the X-axis at the point where nut 18 is relatively close to servomotor 14 as shown in FIG. 6, and section B represents the reverse of the X-axis at the point where nut 18 is relatively away from servomotor 14 as shown in FIG. 7. In FIG. 4, the step of section B is larger than the step of section A (g1<g2). In other words, the correction is more insufficient when the nut is reversed at the point where is relatively away from the servomotor.

Similarly, sections C and D of FIG. 4 represent the reverse point of the Y-axis. In detail, section C represents the reverse of the Y-axis at the point where nut 18 is relatively close to servomotor 14 as shown in FIG. 6, and section D represents the reverse of the Y-axis at the point where nut 18 is relatively away from servomotor 14 as shown in FIG. 7. In FIG. 4, the step of section D is larger than the step of section C (g3<g4).

In other words, the correction is more insufficient when the nut is reversed at the point where is relatively away from the servomotor.

FIG. 5 shows a trajectory wherein the movable body is moved when both the present invention and the backlash correction are applied. Apparent from FIG. 5, the step at each reverse point is substantially eliminated. In other words, an appropriate positional correction is carried out at any position of the nut on the ball screw. In addition, although the trajectory of FIG. 5 includes a protruding portion due to the backlash, this portion can be eliminated by another technique.

Figure 8:
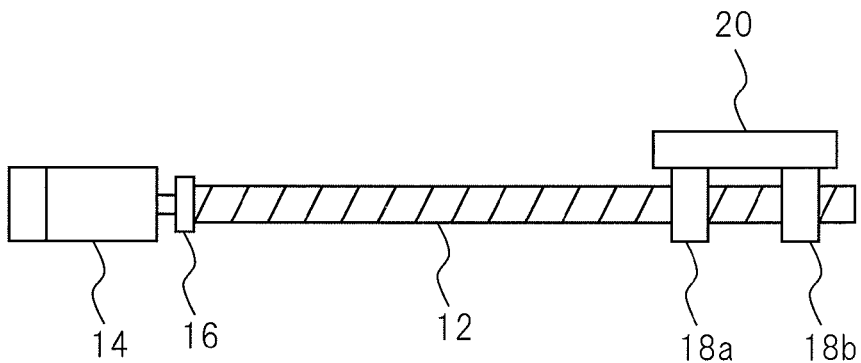
FIG. 8 shows an example wherein two buts are connected to a table.

As shown in FIG. 8, depending on the type of a machine tool, two or more nuts 18a and 18b may be connected to one movable body (or a table). In such a case, it is preferable that the correction and the feedback control be carried out based on the position of the nut which is closest to servomotor 14 (in FIG. 8, nut 18a). This is because the expansion/contraction of the ball screw between the nuts can be ignored in view of the rigidity of the table.

In addition, depending on a machine tool of the other type, a member corresponding to nut 18 may be fixed to a fixed position. In such a case, the servomotor is moved relative to the nut along with the ball screw. Therefore, the above embodiment may be applicable to this case, since the portion corresponding to the distance between the servomotor and the nut is expanded or contracted also in this case. Therefore, the present invention can be similarly applied to this case.

According to the present invention, the error or the decrease of precision, due to the expansion/contraction of the ball screw generated by the force applied to the ball screw when the movable body is accelerated or decelerated (or reversed), is calculated based on the torque of the servomotor and the distance between the servomotor and the movable body. Therefore, the appropriate position compensation may be obtained, corresponding to the position of the movable body, whereby the movable body can be controlled with high accuracy.

The distance between the servomotor and the movable body can be easily calculated based on the rotational angular position of the servomotor or the ball screw.

The position compensation can be easily calculated based on the distance from the servomotor to the movable body and the torque command value.

When the ball screw is coupled to the servomotor via the coupling, the more accurate position compensation may be calculated, in view of the positional error of the nut due to the torsion of the coupling in the rotational direction via the ball screw.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A servo controller for controlling a feed shaft of a machine tool by using a servomotor connected to a ball screw, the servo controller comprising:
   a position command generating part which generates a position command value for the feed shaft;
   a position detecting part which detects an angular position of the servomotor;
   a velocity command generating part which generates a velocity command value for the servomotor based on the position command value generated by the position command generating part and a position detection value detected by the position detecting part;
   a velocity detecting part which detects a velocity of the servomotor;
   a torque command generating part which degenerates a torque command value for the servomotor based on the velocity command value generated by the velocity command generating part and a velocity detection value detected by the velocity detecting part; and
   an amount of position correction calculating part which calculates an amount of position correction for a movable body threadably engaged with the ball screw based on an amount of expansion/contraction of the ball screw, the amount of position correction being used to correct the position command value,
   wherein the amount of position correction calculating part calculates the amount of expansion/contraction of the ball screw based on a distance from the servomotor to the movable body and the torque command value generated by the torque command generating part, and calculates the amount of position correction based on the calculated amount of expansion/contraction of the ball screw.

2. The servo controller as set forth in claim 1, further comprising a distance calculating part which calculates the distance from the servomotor to the movable body threadably engaged with the ball screw, by using an angular position of the servomotor.

3. The servo controller as set forth in claim 2, wherein the distance calculating part utilizes a parameter which is previously determined based on a dimension of each component so as to represent a relationship between the distance from the movable body to the servomotor and a rotational angular position of the ball screw, and calculates the distance from the movable body to the servomotor in real-time at the angular position of the servomotor detected by the position detecting part.

4. The servo controller as set forth in claim 1, wherein the amount of position correction calculating part calculates the amount of expansion/contraction of the ball screw by multiplying the distance from the servomotor to the movable body by the torque command value so as to obtain a product, and by further multiplying the product by a first coefficient relating to the ball screw.

5. The servo controller as set forth in claim 1, wherein the amount of position correction calculating part calculates the amount of position correction as a summation of:
   (i) the amount of expansion/contraction of the ball screw which is obtained by multiplying the distance from the servomotor to the movable body by the torque command value so as to obtain a product, and by further multiplying the product by a first coefficient relating to the ball screw; and
   (ii) a positioning error which is obtained by multiplying the torque command value by a second coefficient relating to a coupling for coupling the servomotor and the ball screw.

* * * * *